(12) United States Patent
Yamada et al.

(10) Patent No.: US 12,092,374 B2
(45) Date of Patent: Sep. 17, 2024

(54) REFRIGERANT CYCLE SYSTEM

(71) Applicant: DAIKIN INDUSTRIES, LTD., Osaka (JP)

(72) Inventors: Takuro Yamada, Osaka (JP); Atsushi Yoshimi, Osaka (JP); Eiji Kumakura, Osaka (JP); Ikuhiro Iwata, Osaka (JP); Kazuhiro Furusho, Osaka (JP); Mikio Kagawa, Osaka (JP); Michio Moriwaki, Osaka (JP); Tomoatsu Minamida, Osaka (JP); Hiromune Matsuoka, Osaka (JP); Junya Minami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 356 days.

(21) Appl. No.: 17/618,202

(22) PCT Filed: Jun. 11, 2020

(86) PCT No.: PCT/JP2020/023069
§ 371 (c)(1),
(2) Date: Dec. 10, 2021

(87) PCT Pub. No.: WO2020/250987
PCT Pub. Date: Dec. 17, 2020

(65) Prior Publication Data
US 2022/0325923 A1 Oct. 13, 2022

(30) Foreign Application Priority Data
Jun. 12, 2019 (JP) .................................. 2019-109416

(51) Int. Cl.
*F25B 13/00* (2006.01)
*F25B 7/00* (2006.01)
(Continued)

(52) U.S. Cl.
CPC ................ *F25B 13/00* (2013.01); *F25B 7/00* (2013.01); *F25B 9/006* (2013.01); *F25B 49/02* (2013.01);
(Continued)

(58) Field of Classification Search
CPC ............ F25B 13/00; F25B 7/00; F25B 9/006; F25B 49/02; F25B 2313/0233; F25B 2313/02742; F25B 2400/121; F25B 2600/2513
See application file for complete search history.

(56) References Cited

U.S. PATENT DOCUMENTS 5,743,102 A * 4/1998 Thomas .................. F25D 17/02
62/436
6,393,858 B1 5/2002 Mezaki et al.
(Continued)

FOREIGN PATENT DOCUMENTS

CN 1303470 A 7/2001
EP 3643988 A1 4/2020
(Continued)

OTHER PUBLICATIONS

JP 2012-12112622 Spec—Translation, 2012.*
(Continued)

*Primary Examiner* — Henry T Crenshaw
(74) *Attorney, Agent, or Firm* — Osha Bergman Watanabe & Burton LLP

(57) ABSTRACT

A refrigerant cycle system includes: a first refrigerant circuit that includes a first heat exchanger, a first compressor, and a first cascade heat exchanger and that is configured as a first vapor compression refrigeration cycle; a second refrigerant circuit that includes the first cascade heat exchanger, a second compressor, and a second heat exchanger and that is configured as a second vapor compression refrigeration (Continued)

cycle; a first unit that accommodates the first heat exchanger and the first compressor; a second unit that accommodates the first cascade heat exchanger and the second compressor; and a third unit that accommodates the second heat exchanger. The first unit, the second unit, and the third unit are disposed apart from each other. The first cascade heat exchanger performs heat exchange between a first refrigerant that flows through the first refrigerant circuit and a second refrigerant that flows through the second refrigerant circuit.

12 Claims, 6 Drawing Sheets

(51) Int. Cl.
    *F25B 9/00*       (2006.01)
    *F25B 49/02*     (2006.01)
(52) U.S. Cl.
    CPC ............... *F25B 2313/0233* (2013.01); *F25B 2313/02742* (2013.01); *F25B 2400/121* (2013.01); *F25B 2600/2513* (2013.01)

(56) References Cited

U.S. PATENT DOCUMENTS

| | | | |
|---|---|---|---|
| 2016/0146496 | A1 | 5/2016 | Yamashita |
| 2017/0074559 | A1 | 3/2017 | Park et al. |

FOREIGN PATENT DOCUMENTS

| | | | | |
|---|---|---|---|---|
| JP | H02-126060 | A | | 5/1990 |
| JP | H07-243711 | A | | 9/1995 |
| JP | H08261517 | A | | 10/1996 |
| JP | 2000-146216 | A | | 5/2000 |
| JP | 2002-228284 | A | | 8/2002 |
| JP | 2007-315706 | A | | 12/2007 |
| JP | 2012 112622 | | * | 6/2012 |
| JP | 2012112622 | A | | 6/2012 |
| JP | 6058145 | B2 | | 1/2017 |
| JP | 2017-161182 | A | | 9/2017 |
| JP | 2018-194260 | A | | 12/2018 |
| WO | 2018/235832 | A1 | | 12/2018 |

OTHER PUBLICATIONS

International Preliminary Report on Patentability issued in corresponding International Application No. PCT/JP2020/023069 dated Dec. 14, 2021 (6 pages).
Extended European Search Report issued in corresponding European Patent Application 20822682.9, mailed Jul. 11, 2022 (8 pages).
International Search Report issued in corresponding International Application No. PCT/JP2020/023069, mailed on Aug. 11, 2020 (7 pages).
Written Opinion issued in corresponding International Application No. PCT/JP2020/023069, mailed on Aug. 11, 2020 (5 pages).

* cited by examiner

REFRIGERANT CYCLE SYSTEM

TECHNICAL FIELD

The present disclosure relates to a refrigerant cycle system.

BACKGROUND

There is a refrigeration apparatus such as an air conditioning apparatus in which a plurality of use-side heat exchangers are connected to one heat-source-side heat exchanger, as in PTL 1 (Japanese Unexamined Patent Application Publication No. 2018-194260).

In the case of using refrigerant having flammability or toxicity, a refrigerant filling amount allowed per room capacity may be limited. However, PTL 1 does not describe limitation of a refrigerant filling amount.

PATENT LITERATURE

[PTL 1] Japanese Unexamined Patent Application Publication No. 2018-194260

SUMMARY

A refrigerant cycle system according to one or more embodiments includes a first refrigerant circuit and a second refrigerant circuit. The first refrigerant circuit is a vapor compression refrigeration cycle. The second refrigerant circuit is a vapor compression refrigeration cycle. The first refrigerant circuit includes a first heat exchanger, a first compressor, and a first cascade heat exchanger. The second refrigerant circuit includes the first cascade heat exchanger, a second compressor, and a second heat exchanger. The first heat exchanger and the first compressor are accommodated in a first unit. The first cascade heat exchanger and the second compressor are accommodated in a second unit. The second heat exchanger is accommodated in a third unit. The first unit, the second unit, and the third unit are disposed apart from each other. The first cascade heat exchanger performs heat exchange between a first refrigerant that flows through the first refrigerant circuit and a second refrigerant that flows through the second refrigerant circuit.

This configuration makes it possible to reduce a refrigerant filling amount with respect to a room capacity and suppresses that the refrigerant filling amount exceeds a limit.

A refrigerant cycle system according one or more embodiments further includes a second cascade heat exchanger, a third compressor, a third heat exchanger, a fourth unit, and a fifth unit. The second cascade heat exchanger, the third compressor, and the third heat exchanger are connected to each other to constitute a third refrigerant circuit. The second cascade heat exchanger and the third compressor are accommodated in the fourth unit. The third heat exchanger is accommodated in the fifth unit. The first unit, the fourth unit, and the fifth unit are disposed apart from each other. The second cascade heat exchanger performs heat exchange between the first refrigerant and a third refrigerant that flows through the third refrigerant circuit.

This makes it possible to connect more use-side heat exchangers to one heat-source-side heat exchanger.

A refrigerant cycle system according to one or more embodiments further includes a first refrigerant flow path switching unit that is disposed between the first unit and the second unit and that is for switching a flow path of the first refrigerant.

This gives a degree of freedom to the flow of the first refrigerant and contributes to a cooling-heating mixed operation.

A refrigerant cycle system according to one or more embodiments further includes a second refrigerant flow path switching unit that is disposed between the second unit and the third unit and that is for switching a flow path of the second refrigerant.

This gives a degree of freedom to the flow of the second refrigerant and contributes to a cooling-heating mixed operation.

In a refrigerant cycle system according to one or more embodiments, the second refrigerant that flows through the second refrigerant circuit has flammability or toxicity.

The configuration of the refrigerant cycle system illustrated in the present disclosure reduces the amount of refrigerant that flows through each refrigerant circuit, and thus further safety can be secured even in the case of using refrigerant having flammability or toxicity.

In a refrigerant cycle system according to one or more embodiments, the first refrigerant and the second refrigerant are each any one of HFC refrigerant, HFO refrigerant, and natural refrigerant. Alternatively, the first refrigerant and the second refrigerant are each a mixed refrigerant containing any two or more of HFC refrigerant, HFO refrigerant, natural refrigerant, and $CF_3I$.

In a refrigerant cycle system according to one or more embodiments, the first refrigerant is R32.

In a refrigerant cycle system according to one or more embodiments, the first refrigerant and the second refrigerant are each R32.

This makes it possible to apply an existing refrigerant cycle system.

In a refrigerant cycle system according to one or more embodiments, the second compressor accommodated in the second unit is a horizontal compressor.

The horizontal second compressor is preferable for being installed in a low-height space, such as a ceiling cavity.

In a refrigerant cycle system according to one or more embodiments, the second refrigerant circuit includes an expansion mechanism, and the second refrigerant that flows into the expansion mechanism is in a gas-liquid two-phase state.

This makes it possible to reduce the amount of the second refrigerant that flows through the second refrigerant circuit.

In a refrigerant cycle system according to one or more embodiments, the first refrigerant circuit further includes a fourth heat exchanger and a sixth unit. The fourth heat exchanger is used as a use-side heat exchanger. The sixth unit accommodates the fourth heat exchanger.

BRIEF DESCRIPTION OF DRAWINGS

DETAILED DESCRIPTION (1) Configuration of Air Conditioning Apparatus According to One or More Embodiments FIG. 1 is a diagram illustrating refrigerant circuits of an air conditioning apparatus 100 according to one or more embodiments. The air conditioning apparatus 100 according to one or more embodiments of a refrigerant cycle system performs cooling or heating in a structure, such as a building, by using a first refrigerant circuit 1, a second refrigerant circuit 2, and a third refrigerant circuit 3, each of which is a vapor compression refrigeration cycle.

Figure 1:
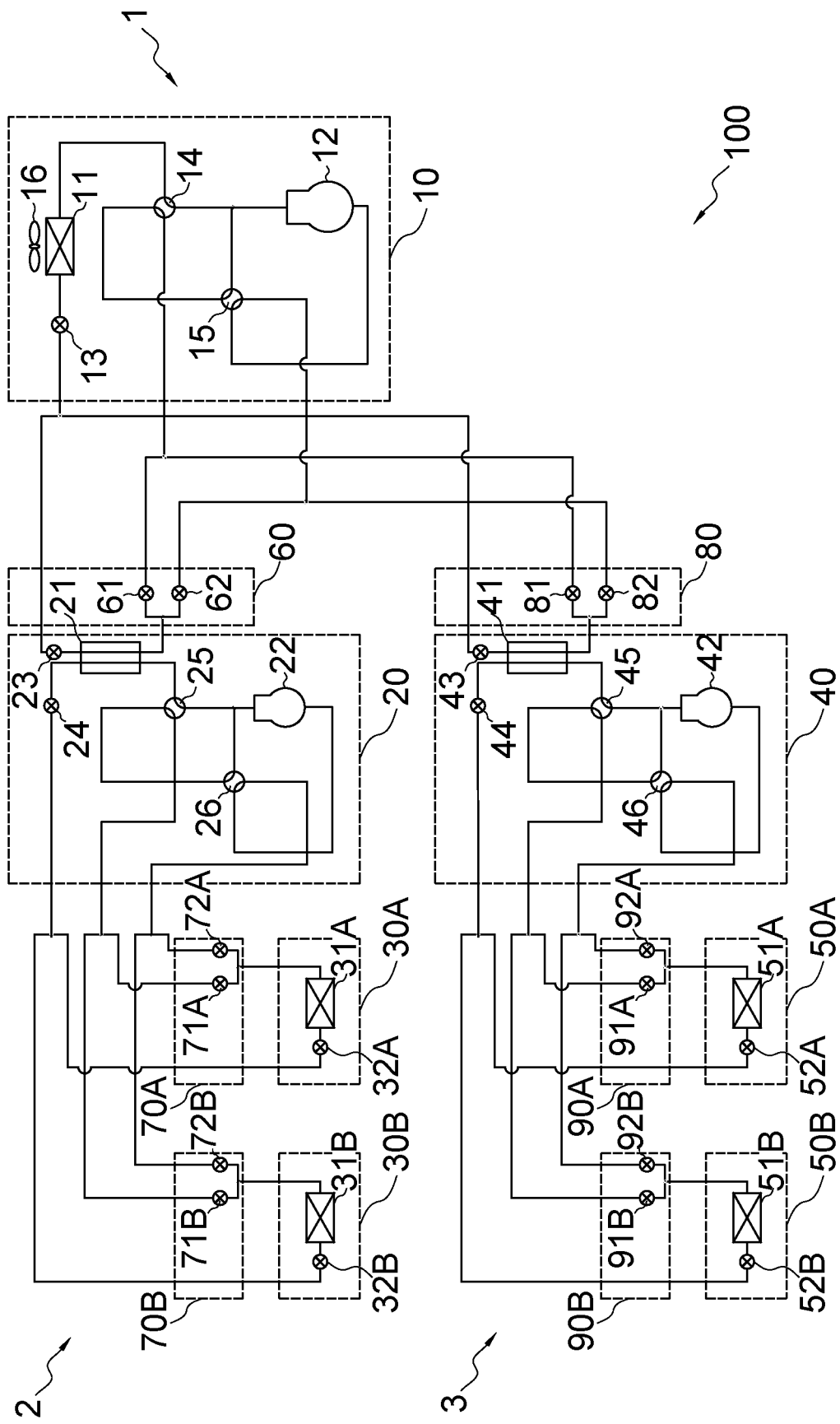
FIG. 1 is a diagram illustrating refrigerant circuits of an air conditioning apparatus according to one or more embodiments.

The air conditioning apparatus 100 mainly includes a first unit 10, a second unit 20, a plurality of (herein two) third units 30A and 30B, a fourth unit 40, a plurality of (herein two) fifth units 50A and 50B, a first branch unit 60, a plurality of (herein two) second branch units 70A and 70B, a third branch unit 80, a plurality of (herein two) fourth branch units 90A and 90B, and connection pipes.

The first refrigerant circuit 1 is constituted by the first unit 10, which is a heat-source-side unit; the second unit 20, which is a cascade unit; the first branch unit 60; the third unit 30, which is a cascade unit; the third branch unit 80; and connection pipes 1A, 1B, and 1C (see FIGS. 3, 4A, and 4B), which are connected to each other.

The second refrigerant circuit 2 is constituted by the second unit 20; the third units 30A and 30B, which are use-side units; the second branch units 70A and 70B; and connection pipes 2A, 2B, and 2C (see FIGS. 4A and 5A), which are connected to each other. The second refrigerant circuit 2 of the air conditioning apparatus 100 is configured to enable a cooling-heating mixed operation in which cooling or heating is selected for each use-side unit.

The third refrigerant circuit 3 is constituted by the fourth unit 40; the fifth units 50A and 50B, which are use-side units; the fourth branch units 90A and 90B; and connection pipes 3A, 3B, and 3C (see FIGS. 4B and 5B), which are connected to each other. The third refrigerant circuit 3 of the air conditioning apparatus 100 is configured to enable a cooling-heating mixed operation in which cooling or heating is selected for each use-side unit.

The first refrigerant circuit 1, the second refrigerant circuit 2, and the third refrigerant circuit 3 are respectively filled with a first refrigerant, a second refrigerant, and a third refrigerant, each of which is R32.

Figure 2:
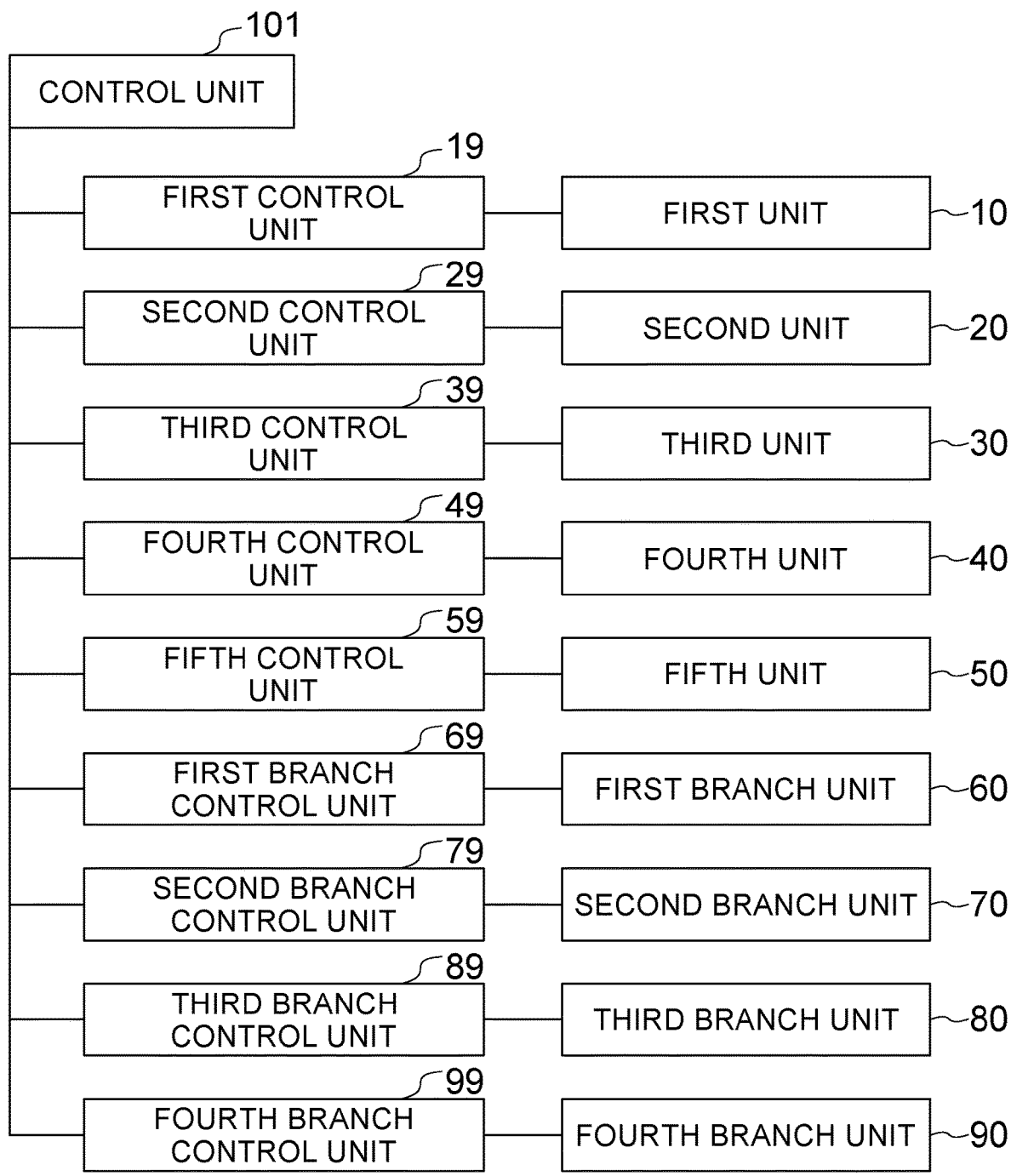
FIG. 2 is a diagram illustrating an overview of control units according to one or more embodiments.

The air conditioning apparatus 100 also includes a control unit 101 illustrated in FIG. 2. The control unit 101 is disposed, for example, for the first unit 10, but is not limited thereto. The control unit 101 according to one or more embodiments includes a first control unit 19 disposed for the first unit 10, a second control unit 29 disposed for the second unit 20, a third control unit 39 disposed for the third unit 30, a fourth control unit 49 disposed for the fourth unit 40, a fifth control unit 59 disposed for the fifth unit 50, a first branch control unit 69 disposed for the first branch unit 60, a second branch control unit 79 disposed for the second branch unit 70, a third branch control unit 89 disposed for the third branch unit 80, and a fourth branch control unit 99 disposed for the fourth branch unit 90.

The control units 101, 19, 29, 39, 49, 59, 69, 79, 89, and 99 each include a control board on which electric components such as a microcomputer and a memory are mounted. The control unit 101 controls the entire air conditioning apparatus 100 via the individual control units 19, 29, 39, 49, 59, 69, 79, 89, and 99 disposed for the respective units 10, 20, 30, 40, 50, 60, 70, 80, and 90. For example, the control unit 101 receives values detected by sensors provided in the respective units 10, 20, 30, 40, 50, 60, 70, 80, and 90 via the control units 19, 29, 39, 49, 59, 69, 79, 89, and 99 disposed for the respective units 10, 20, 30, 40, 50, 60, 70, 80, and 90. For example, the control unit 101 is capable of transmitting a control signal or the like to a component included in each of the units 10, 20, 30, 40, 50, 60, 70, 80, and 90.

Figure 3:
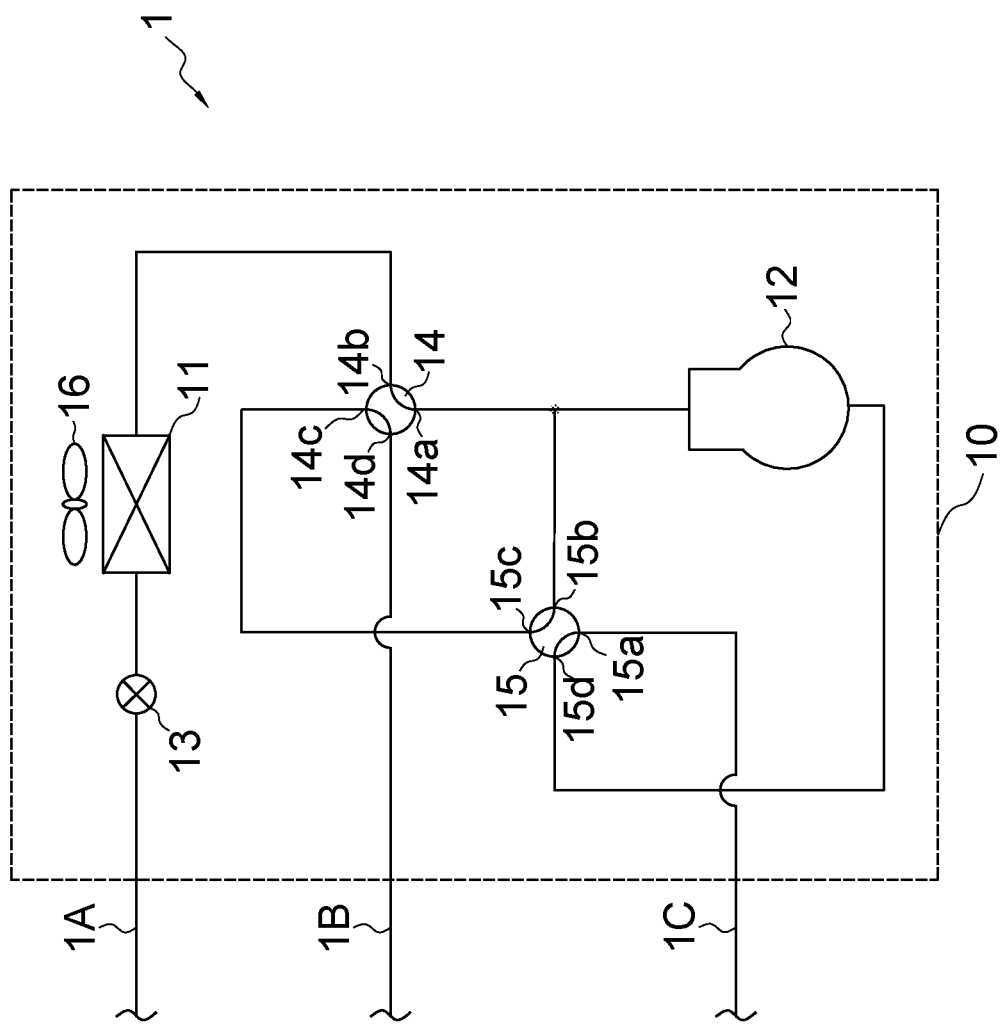
FIG. 3 is a diagram illustrating a refrigerant circuit of a first unit according to one or more embodiments.

(2) Detailed Configuration of Each Unit According to One or More Embodiments (2-1) First Unit FIG. 3 illustrates individual components of the first unit 10 according to one or more embodiments. The first unit 10, which is a heat-source-side unit, is installed on a roof of a building or the like or around a building or the like, and is connected to the second unit 20 and the fourth unit 40 via the connection pipes 1A, 1B, and 1C, the first branch unit 60, and the third branch unit 80 so as to constitute part of the first refrigerant circuit 1 (see FIG. 1).

The first unit 10 mainly includes a heat-source-side heat exchanger 11, a compressor 12, an expansion valve 13, two four-way switching valves 14 and 15 constituting a switching mechanism, and a fan 16.

The heat-source-side heat exchanger 11 is a heat exchanger that performs heat exchange between the first refrigerant and outdoor air, thereby functioning as a radiator or evaporator for the first refrigerant.

The compressor 12 is a positive-displacement compressor of a rotary type, a scroll type, or the like, sucks the first refrigerant, compresses the sucked first refrigerant, and discharges the first refrigerant.

The expansion valve 13 is an electric expansion valve that performs decompression of the first refrigerant, adjustment of the flow rate of the first refrigerant, and so forth. The expansion valve 13 has an opening degree that is controlled by the control unit 101 illustrated in FIG. 2 via the first control unit 19.

The four-way switching valve 14 is an electric valve capable of switching between a heat-source-side radiation state in which the heat-source-side heat exchanger 11 functions as a radiator for the first refrigerant and a heat-source-side evaporation state in which the heat-source-side heat exchanger 11 functions as an evaporator for the first refrigerant. A first port 14a of the four-way switching valve 14 is connected to a discharge side of the compressor 12, a second port 14b is connected to a gas side of the heat-source-side heat exchanger 11, a third port 14c is connected to a third port 15c of the four-way switching valve 15, and a fourth port 14d is connected to the connection pipe 1B. The four-way switching valve 14 is capable of switching between a state in which the first port 14a and the second port 14b are connected to each other and the third port 14c and the fourth port 14d are connected to each other (the heat-source-side radiation state) and a state in which the second port 14b and the third port 14c are connected to each other and the first port 14a and the fourth port 14d are connected to each other (the heat-source-side evaporation state).

The four-way switching valve 15 is an electric valve capable of switching between a state in which the discharge side of the compressor 12 communicates with the connection pipe 1C and a state in which the discharge side of the compressor 12 communicates with the third port 14c of the four-way switching valve 14. A first port 15a of the four-way switching valve 15 is connected to the connection pipe 1C, a second port 15b is connected to the discharge side of the compressor 12, the third port 15c is connected to the third port 15c of the four-way switching valve 14, and a fourth port 15d is connected to a suction side of the compressor 12.

The switching mechanism constituted by the two four-way switching valves 14 and 15 is not limited to a mechanism constituted by four-way switching valves and may be, for example, a mechanism constituted by combining a plurality of electromagnetic valves or the like so as to have a function of switching a flow direction of the first refrigerant similar to the above.

(2-2) Second Unit

Figure 4A:
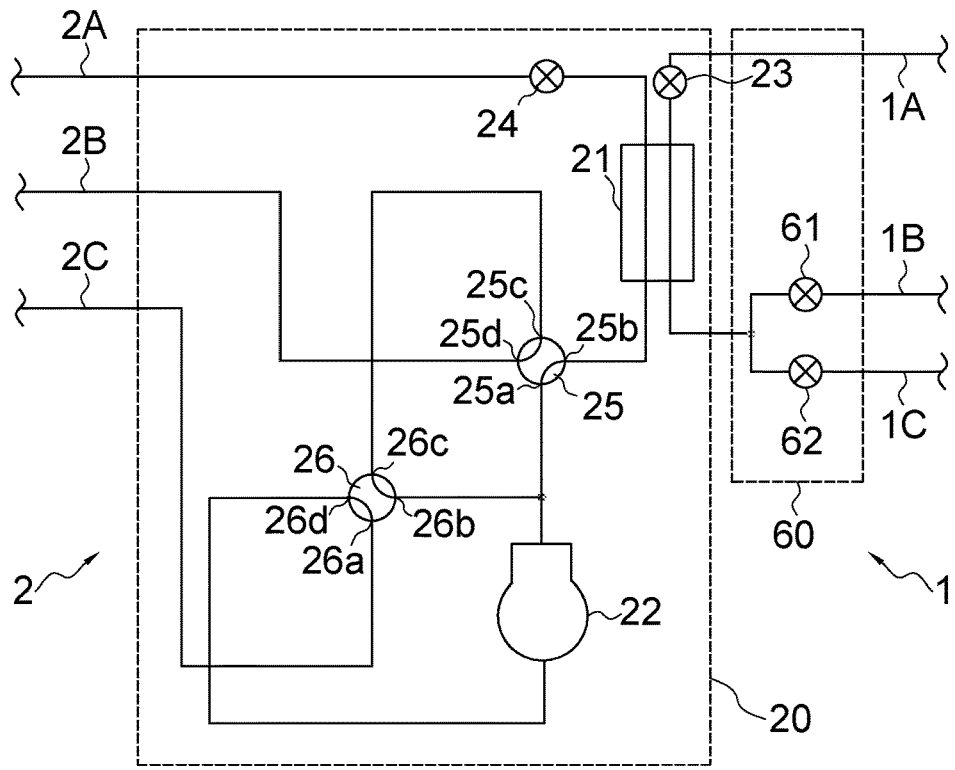
FIG. 4A is a diagram illustrating a refrigerant circuit of a second unit and a first branch unit according to one or more embodiments.

FIG. 4A illustrates individual components of the second unit 20 according to one or more embodiments. The second unit 20, which is a first cascade unit, is installed in a ceiling cavity or the like of each floor in a building or the like. One end of the second unit 20 is connected to the first unit 10 via the connection pipes 1A, 1B, and 1C and the first branch unit 60. The other end of the second unit 20 is connected to the third units 30A and 30B via the connection pipes 2A, 2B, and 2C and the second branch units 70A and 70B.

The second unit 20 mainly includes a first cascade heat exchanger 21, a compressor 22, an expansion valve 23 on the first refrigerant circuit 1 side, an expansion valve 24 on the second refrigerant circuit 2 side, and two four-way switching valves 25 and 26 constituting a switching mechanism.

The first cascade heat exchanger 21 is a heat exchanger that performs heat exchange between the first refrigerant that flows through the first refrigerant circuit 1 and the second refrigerant that flows through the second refrigerant circuit 2, thereby functioning as a radiator or an evaporator. When functioning as a radiator in the first refrigerant circuit 1, the first cascade heat exchanger 21 functions as an evaporator in the second refrigerant circuit 2. When functioning as an evaporator in the first refrigerant circuit 1, the first cascade heat exchanger 21 functions as a radiator in the second refrigerant circuit 2.

The compressor 22 is a positive-displacement compressor of a rotary type, a scroll type, or the like, sucks the second refrigerant, compresses the sucked second refrigerant, and discharges the second refrigerant. The compressor 22 is a horizontal compressor in which a compression element is disposed inside a horizontal casing. A horizontal compressor is defined as a compressor in which, among the height, depth, and width thereof, the depth or width is the largest.

The expansion valve 23 is an electric expansion valve that performs decompression of the first refrigerant, adjustment of the flow rate of the first refrigerant, and so forth. The expansion valve 23 has an opening degree that is controlled by the control unit 101 via the first control unit 19.

The expansion valve 24 is an electric expansion valve that performs decompression of the second refrigerant, adjustment of the flow rate of the second refrigerant, and so forth. The expansion valve 24 has an opening degree that is controlled by the control unit 101 via the second control unit 29. The air conditioning apparatus 100 performs, in a cooling operation mode described below, two-phase refrigerant transfer in which the expansion valve 24 causes the second refrigerant in a gas-liquid two-phase state to flow through the connection pipe 2A and to be transmitted to the third units 30A and 30B.

The four-way switching valve 25 is an electric valve capable of switching between a heat-source-side radiation state in which the first cascade heat exchanger 21 functions as an evaporator for the first refrigerant and a heat-source-side evaporation state in which the first cascade heat exchanger 21 functions as a radiator for the first refrigerant. A first port 25a of the four-way switching valve 25 is connected to a discharge side of the compressor 22, a second port 25b is connected to a gas side of the first cascade heat exchanger 21, a third port 25c is connected to a third port 26c of the four-way switching valve 26, and a fourth port 25d is connected to the connection pipe 2B. The four-way switching valve 25 is capable of switching between a state in which the first port 25a and the second port 5b are connected to each other and the third port 25c and the fourth port 25d are connected to each other (the heat-source-side radiation state) and a state in which the second port 25b and the third port 25c are connected to each other and the first port 25a and the fourth port 25d are connected to each other (the heat-source-side evaporation state).

The four-way switching valve 26 is an electric valve capable of switching between a state in which the discharge side of the compressor 22 communicates with the connection pipe 2C and a state in which the discharge side of the compressor 22 communicates with the third port 25c of the four-way switching valve 25. A first port 26a of the four-way switching valve 26 is connected to the connection pipe 2C, a second port 26b is connected to the discharge side of the compressor 22, the third port 26c is connected to the third port 25c of the four-way switching valve 25, and a fourth port 26d is connected to a suction side of the compressor 22.

(2-3) First Branch Unit

The first branch unit 60 is disposed, for example, near the second unit 20. The first branch unit 60, together with the connection pipes 1A, 1B, and 1C, is interposed between the second unit 20 and the first unit, and constitutes part of the first refrigerant circuit 1.

The first branch unit 60 mainly includes a first branch path including a branch unit switching valve 61 and a second branch path including a branch unit switching valve 62. The branch unit switching valve 61 is an electromagnetic valve that switches between communication and non-communication between the connection pipe 1B and the first cascade heat exchanger 21. The branch unit switching valve 62 is an electromagnetic valve that switches between communication and non-communication between the connection pipe 1C and the first cascade heat exchanger 21.

(2-4) Fourth Unit

Figure 4B:
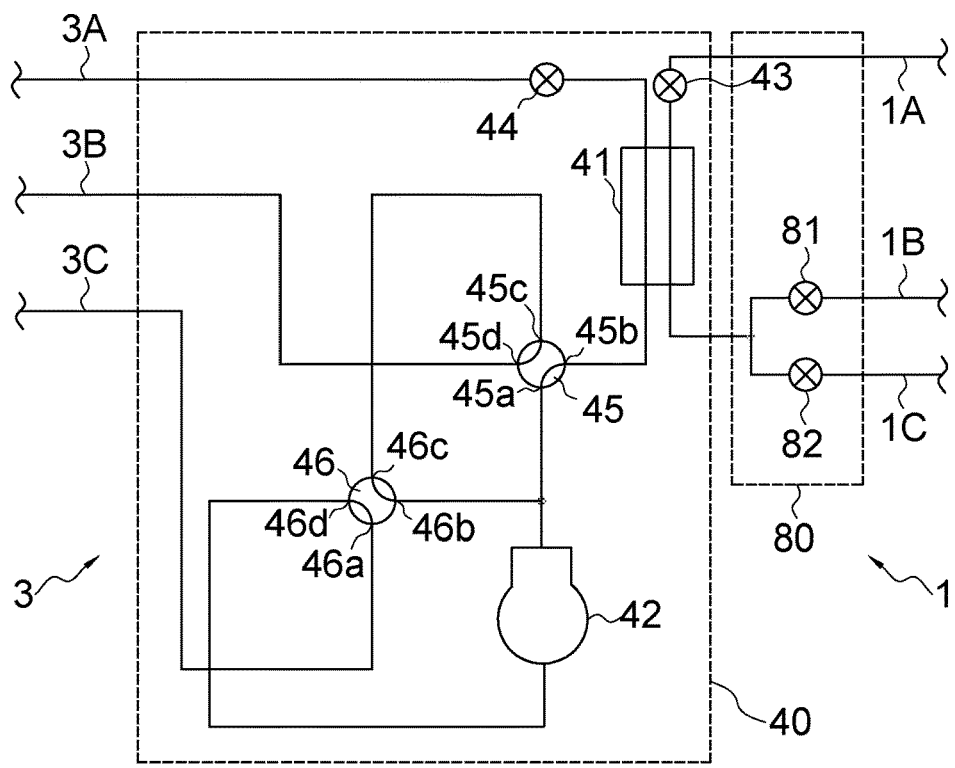
FIG. 4B is a diagram illustrating a refrigerant circuit of a fourth unit and a third branch unit according to one or more embodiments.

FIG. 4B illustrates individual components of the fourth unit 40 according to one or more embodiments. The fourth unit 40, which is a cascade unit, is installed in a ceiling cavity or the like of each floor in a building or the like. One end of the fourth unit 40 is connected to the first unit 10 via the connection pipes 1A, 1B, and 1C and the third branch unit 80. The other end of the fourth unit 40 is connected to the fifth unit 50 via the connection pipes 3A, 3B, and 3C and the fourth branch unit 90.

The fourth unit 40 mainly includes a second cascade heat exchanger 41, a compressor 42, an expansion valve 43 on the first refrigerant circuit 1 side, an expansion valve 44 on the third refrigerant circuit 3 side, and two four-way switching valves 45 and 46 constituting a switching mechanism. In one or more embodiments, the individual components of the fourth unit 40 are similar to the individual components of the second unit, and thus the description thereof is omitted.

(2-5) Third Branch Unit

The third branch unit 80 is installed, for example, near the fourth unit 40 in a ceiling cavity or the like of each floor in a building or the like. The third branch unit 80, together with the connection pipes 1A, 1B, and 1C, is interposed between the fourth unit 40 and the first unit, and constitutes part of the first refrigerant circuit 1.

The third branch unit 80 mainly includes a first branch path including a branch unit switching valve 81 and a second branch path including a branch unit switching valve 82. In one or more embodiments, the individual components of the third branch unit 80 are similar to the individual components of the first branch unit 60, and thus the description thereof is omitted.

(2-6) Third Unit

Figure 5A:
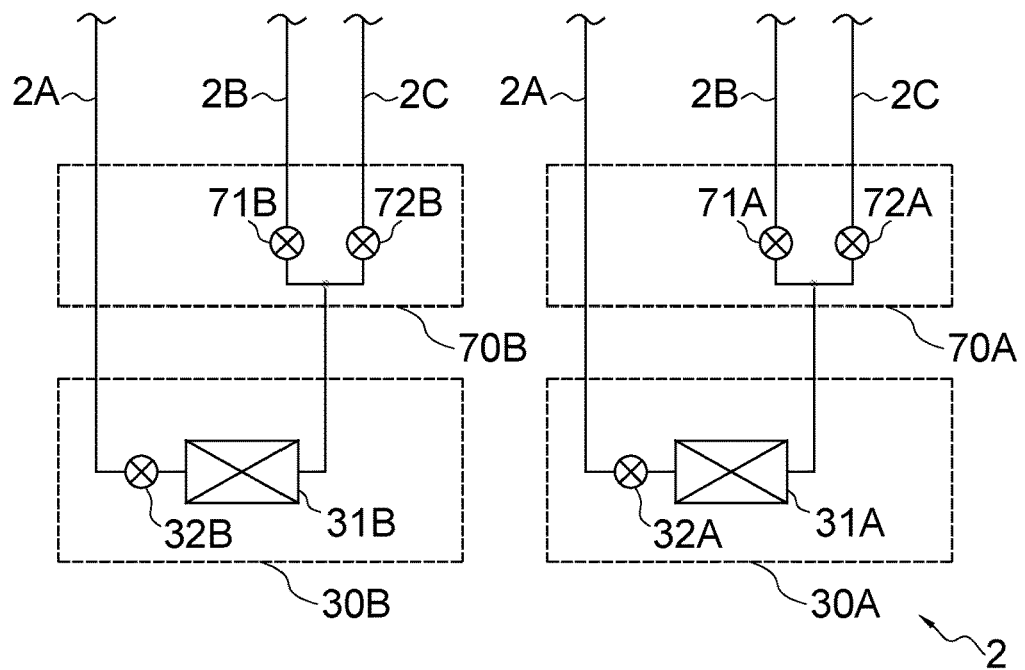
FIG. 5A is a diagram illustrating a refrigerant circuit of a third unit and a second branch unit according to one or more embodiments.
Figure 5B:
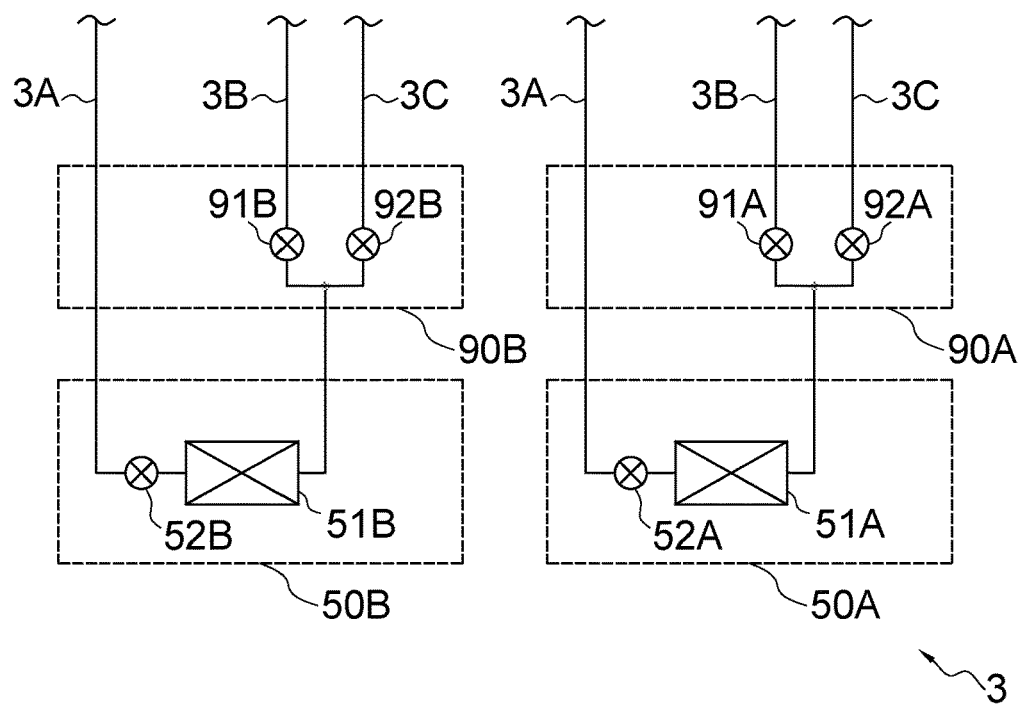
FIG. 5B is a diagram illustrating a refrigerant circuit of a fifth unit and a fourth branch unit according to one or more embodiments.

FIG. 5A illustrates individual components of the third unit 30 according to one or more embodiments. The plurality of third units 30A and 30B, which are use-side units, are embedded in or hung on a ceiling or are hung on a wall surface, in each room or the like in a building or the like. The third units 30A and 30B are connected to the second unit 20 via the connection pipes 2A, 2B, and 2C and the second branch units 70A and 70B, and constitute part of the second refrigerant circuit 2.

Next, the configurations of the third units 30A and 30B will be described. The third unit 30A includes a use-side heat exchanger 31A and an expansion valve 32A. The third unit 30B includes a use-side heat exchanger 31B and an expansion valve 32B. The use-side heat exchangers 31A and 31B are heat exchangers that perform heat exchange between the second refrigerant and indoor air, thereby processing an indoor air conditioning load (thermal load). The expansion valves 32A and 32B each have an opening degree that is controlled by the control unit 101 via the third control unit 39.

(2-7) Second Branch Unit

The second branch units 70A and 70B are installed, for example, near the third units 30A and 30B. The second branch units 70A and 70B, together with the connection pipes 2A, 2B, and 2C, are interposed between the third units 30A and 30B and the second unit 20, and constitute part of the second refrigerant circuit 2. The second branch units 70A and 70B may be installed for the third units 30A and 30B, which are two use-side units, in a one-to-one relationship. Alternatively, a plurality of use-side units having the same cooling/heating switch timing may be connected to one branch unit.

The second branch units 70A and 70B each mainly include a first branch path including a corresponding one of branch unit switching valves 71A and 71B and a second branch path including a corresponding one of branch unit switching valves 72A and 72B. The branch unit switching valves 71A and 71B are each an electromagnetic valve that switches between communication and non-communication between the connection pipe 2B and a corresponding one of the use-side heat exchangers 31A and 31B. The branch unit switching valves 72A and 72B are each an electromagnetic valve that switches between communication and non-communication between the connection pipe 2C and a corresponding one of the use-side heat exchangers 31A and 31B.

(2-8) Fifth Unit

The plurality of fifth units 50A and 50B, which are use-side units, are embedded in or hung on a ceiling or are hung on a wall surface, in each room or the like in a building or the like. The fifth units 50A and 50B are connected to the fourth unit 40 via the connection pipes 3A, 3B, and 3C and the fourth branch units 90A and 90B, and constitute part of the third refrigerant circuit 3.

The fifth unit 50A includes a use-side heat exchanger 51A and an expansion valve 52A. The fifth unit 50B includes a use-side heat exchanger 51B and an expansion valve 52B. In one or more embodiments, the individual components of the fifth units 50A and 50B are similar to the individual components of the third unit 30, and thus the description thereof is omitted.

(2-9) Fourth Branch Unit

The fourth branch units 90A and 90B are installed, for example, near the fifth units 50A and 50B. The fourth branch units 90A and 90B, together with the connection pipes 3A, 3B, and 3C, are interposed between the fifth units 50A and 50B and the fourth unit 40, and constitute part of the third refrigerant circuit 3.

The fourth branch units 90A and 90B each mainly include a first branch path including a corresponding one of branch unit switching valves 91A and 91B and a second branch path including a corresponding one of branch unit switching valves 92A and 92B. In one or more embodiments, the individual components of the fourth branch units 90A and 90B are similar to the individual components of the second branch units 70A and 70B, and thus the description thereof is omitted.

(3) Operation of Air Conditioning Apparatus According to One or More Embodiments A description will be given of operations of individual components in a cooling operation mode and a heating operation mode 60b as operation modes of the air conditioning apparatus according to one or more embodiments. In the cooling operation mode, all of the third units 30A and 30B and the fifth units 50A and 50B, which are use units, perform cooling. In the heating operation mode, all of the third units 30A and 30B and the fifth units 50A and 50B perform heating. The air conditioning apparatus 100 is capable of operating in a cooling-heating mixed operation mode in which one or some of the third units 30A and 30B and the fifth units 50A and 50B perform a cooling operation and one or some of or all of the remaining units perform a heating operation. Hereinafter, operations of the air conditioning apparatus 100 in the two operation modes will be described.

(3-1) Cooling Operation Mode

A description will be given of the cooling operation mode in which all of the third units 30A and 30B and the fifth units 50A and 50B, which are use-side units, perform cooling. In the first refrigerant circuit 1, the heat-source-side heat exchanger 11 functions as a radiator for the first refrigerant. The expansion valve 13 is adjusted in the opening degree so as to avoid decompression of the refrigerant as much as possible (for example, so as to be in a fully opened state). The first refrigerant passes through the expansion valve 13 and flows to the second unit 20 and the fourth unit 40 via the first branch unit 60 or the third branch unit 80.

In the first branch unit 60, the branch unit switching valve 61 is closed and the branch unit switching valve 62 is opened, and the first cascade heat exchanger 21 is caused to function as an evaporator for the first refrigerant in the first refrigerant circuit 1. The first refrigerant that has evaporated in the first cascade heat exchanger 21 passes through the connection pipe 1C and the four-way switching valve 15 and is sucked into the compressor 12. The expansion valve 23 is adjusted in the opening degree in accordance with a cooling load of the first cascade heat exchanger 21.

In the third branch unit 80, the branch unit switching valve 81 is closed and the branch unit switching valve 82 is opened, and the second cascade heat exchanger 41 is caused to function as an evaporator for the first refrigerant in the first refrigerant circuit 1. The first refrigerant that has evaporated in the second cascade heat exchanger 41 passes through the connection pipe 1C and the four-way switching valve 15 and is sucked into the compressor 12. The expansion valve 43 is adjusted in the opening degree in accordance with a cooling load of the second cascade heat exchanger 41.

In the second refrigerant circuit 2, the first cascade heat exchanger 21 functions as a radiator for the second refrigerant, and the expansion valve 24 is adjusted in the opening degree so as to avoid decompression of the second refrigerant as much as possible (for example, so as to be in a fully opened state). The second refrigerant passes through the expansion valve 24 and flows to the third units 30A and 30B via the second branch units 70A and 70B.

In the second branch unit 70A, the branch unit switching valve 71A is closed and the branch unit switching valve 72A is opened, and the use-side heat exchanger 71A is caused to function as an evaporator for the second refrigerant in the second refrigerant circuit 2. The first refrigerant that has evaporated in the use-side heat exchanger 71A passes through the connection pipe 2C and the four-way switching valve 26 and is sucked into the compressor 22. The expansion valve 32A is adjusted in the opening degree in accordance with a cooling load of the use-side heat exchanger 71A.

In the second branch unit 70B, the branch unit switching valve 71B is closed and the branch unit switching valve 72B is opened, and the use-side heat exchanger 31B is caused to function as an evaporator for the second refrigerant in the second refrigerant circuit 2. The first refrigerant that has evaporated in the use-side heat exchanger 71B passes through the connection pipe 2C and the four-way switching valve 26 and is sucked into the compressor 22. The expansion valve 32B is adjusted in the opening degree in accordance with a cooling load of the use-side heat exchanger 31B.

In the third refrigerant circuit 3, the third refrigerant circulates in an operation similar to that in the second refrigerant circuit 2. Here, the description is omitted.

(3-2) Heating Operation Mode

In the heating operation mode in which all of the third units 30A and 30B and the fifth units 50A and 50B perform heating, the first refrigerant discharged from the compressor 12 flows through the four-way switching valve 14 to the connection pipe 1B and flows through the first branch unit 60 or the third branch unit 80 into the second unit 20 and the fourth unit 40 in the first refrigerant circuit 1.

In the first branch unit 60, the branch unit switching valve 61 is opened and the branch unit switching valve 62 is closed, and the first cascade heat exchanger 21 is caused to function as a radiator for the first refrigerant. The first refrigerant that has condensed in the first cascade heat exchanger 21 flows to the heat-source-side heat exchanger 11 via the expansion valve 13, and the first refrigerant that has evaporated there is sucked into the compressor 12 via the first and the four-way switching valves 14 and 15. The expansion valve 13 is adjusted in the opening degree so as to decompress the first refrigerant. The expansion valve 23 is adjusted in the opening degree in accordance with a heating load of the first cascade heat exchanger 21.

In the third branch unit 80, the branch unit switching valve 81 is opened and the branch unit switching valve 82 is closed, and the second cascade heat exchanger 41 is caused to function as a radiator for the first refrigerant. The second refrigerant that has condensed in the second cascade heat exchanger 41 flows to the heat-source-side heat exchanger 11 via the expansion valve 13, and the first refrigerant that has evaporated there is sucked into the compressor 12 via the first and the four-way switching valves 14 and 15. The expansion valve 43 is adjusted in the opening degree in accordance with a heating load of the second cascade heat exchanger 41.

In the second refrigerant circuit, the second refrigerant that has been discharged from the compressor 22 flows through the four-way switching valve 25 to the connection pipe 2B and flows through the second branch units 70A and 70B into the third units 30A and 30B.

In the second branch unit 70A, the branch unit switching valve 71A is opened and the branch unit switching valve 72A is closed, and the use-side heat exchanger 31A is caused to function as a radiator for the second refrigerant. The second refrigerant that has condensed in the use-side heat exchanger 31A flows to the first cascade heat exchanger 21 via the expansion valve 32A, and the second refrigerant that has evaporated there is sucked into the compressor 22 via the first and the four-way switching valves 25 and 26. The expansion valve 24 is adjusted in the opening degree so as to decompress the second refrigerant. The expansion valve 32A is adjusted in the opening degree in accordance with a heating load of the use-side heat exchanger 31A.

In the branch unit 70B, the branch unit switching valve 71B is opened and the branch unit switching valve 72B is closed, and the use-side heat exchanger 31B is caused to function as a radiator for the second refrigerant. The second refrigerant that has condensed in the use-side heat exchanger 31B flows to the first cascade heat exchanger 21 via the expansion valve 32B, and the second refrigerant that has evaporated there is sucked into the compressor 22 via the first and the four-way switching valves 25 and 26. The expansion valve 24 is adjusted in the opening degree so as to decompress the second refrigerant. The expansion valve 32B is adjusted in the opening degree in accordance with a heating load of the use-side heat exchanger 31B.

In the third refrigerant circuit 3, the third refrigerant circulates in an operation similar to that in the second refrigerant circuit 2. Here, the description is omitted.

(4) Features (4-1)

The air conditioning apparatus 100 serving as a refrigerant cycle system according to one or more embodiments includes the first refrigerant circuit 1 and the second refrigerant circuit 2. The first refrigerant circuit 1 is a vapor compression refrigeration cycle. The second refrigerant circuit 2 is a vapor compression refrigeration cycle. The first refrigerant circuit 1 includes the heat-source-side heat exchanger 11 serving as a first heat exchanger, the compressor 12 serving as a first compressor, and the first cascade heat exchanger 21. The second refrigerant circuit 2 includes the first cascade heat exchanger 21, the compressor 22 serving as a second compressor, and the use-side heat exchangers 31A and 31B serving as a second heat exchanger. The heat-source-side heat exchanger 11 and the compressor 12 are accommodated in the first unit 10. The first cascade heat exchanger 21 and the compressor 22 are accommodated in the second unit 20. The use-side heat exchangers 31A and 31B are accommodated in the third unit 30. The first unit 10, the second unit 20, and the third unit 30 are disposed apart from each other. The first cascade heat exchanger 21 performs heat exchange between the first refrigerant that flows through the first refrigerant circuit 1 and the second refrigerant that flows through the second refrigerant circuit 2.

Hitherto, refrigerant having flammability or toxicity may be used as refrigerant for a refrigerant cycle system. In the case of using such refrigerant, an allowed refrigerant amount per capacity of each room or the like in a structure such as a building is limited. When an allowed refrigerant amount per capacity exceeds a limitation amount, it is necessary to install a refrigerant leakage detection sensor for securing safety, a shutoff valve of a refrigerant pipe, or the like, which increases the device cost or installation cost of the refrigerant cycle system.

The air conditioning apparatus 100 serving as a refrigerant cycle system illustrated in the present disclosure includes the first refrigerant circuit 1 and the second refrigerant circuit 2 connected to each other using the first cascade heat exchanger 21, and thus it is possible to reduce the refrigerant amount per capacity of each room or the like. Accordingly, it is possible to reduce cases in which safety measures are necessary.

(4-2)

The air conditioning apparatus 100 further includes the second cascade heat exchanger 41, the compressor 42 serving as a third compressor, the use-side heat exchangers 51A and 51B serving as a third heat exchanger, the fourth unit 40, and the fifth unit 50. In the air conditioning apparatus 100, the second cascade heat exchanger 41, the compressor 42, and the use-side heat exchangers 51A and 51B are connected to each other to constitute the third refrigerant circuit 3. The second cascade heat exchanger 41 and the compressor 42 are accommodated in the fourth unit 40. The use-side heat exchangers 51A and 51B are accommodated in the fifth unit 50. The first unit 10, the fourth unit 40, and the fifth unit 50 are disposed apart from each other. The second cascade heat exchanger 41 performs heat exchange between the first refrigerant that flows through the first refrigerant circuit 1 and the third refrigerant that flows through the third refrigerant circuit 3.

For example, the second unit 20 is installed in each floor in a distributed manner, and thereby refrigerant circuits for respective floors can be provided. Thus, it is possible to further reduce cases in which safety measures are necessary.

(4-3)

The air conditioning apparatus 100 further includes the first branch unit 60 serving as a first refrigerant flow path switching unit that is disposed between the first unit 10 and the second unit 20 and that is for switching a flow path of the first refrigerant that flows through the first refrigerant circuit 1.

The air conditioning apparatus 100 further includes the second branch units 70A and 70B serving as a second refrigerant flow path switching unit that is disposed between the second unit 20 and the third units 30A and 30B and that is for switching a flow path of the second refrigerant that flows through the second refrigerant circuit 2.

The air conditioning apparatus 100 further includes the third branch unit 80 that is disposed between the first unit 10 and the third unit 30 and that is for switching a flow path of the first refrigerant that flows through the first refrigerant circuit 1.

The air conditioning apparatus 100 further includes the fourth branch units 90A and 90B that are disposed between the fourth unit 40 and the fifth units 50A and 50B and that are for switching a flow path of the third refrigerant that flows through the third refrigerant circuit 3.

Accordingly, the air conditioning apparatus 100 is capable of performing a cooling-heating mixed operation in which cooling or heating is selected for each of the use-side units 30A, 30B, 50A, and 50B.

(4-4)

In the air conditioning apparatus 100, the second refrigerant that flows through the second refrigerant circuit 2 and the third refrigerant that flows through the third refrigerant circuit 3 are each R32.

R32, which has a small influence on an environment, is a refrigerant typically used in an air conditioning apparatus. However, R32 is slightly flammable, and thus it is necessary to secure further safety under the assumption of a case where the refrigerant leaks in an unexpected event, such as a natural disaster.

The air conditioning apparatus 100 according to one or more embodiments includes the first cascade heat exchanger 21 and the second cascade heat exchanger 41 and thereby being capable of further reducing the amount of refrigerant flowing through each of the refrigerant circuits 1, 2, and 3. Accordingly, it is possible to secure further safety.

(4-5)

The second refrigerant circuit 2 of the air conditioning apparatus 100 includes the expansion valve 24 serving as an expansion mechanism. A fluid flowing into the expansion valve 24 is in a gas-liquid two-phase state. The third refrigerant circuit 3 includes the expansion valve 44. A fluid flowing into the expansion valve 44 is in a gas-liquid two-phase state.

This makes it possible to further reduce the amount of refrigerant that flows through each of the refrigerant circuits 2 and 3.

(4-6)

In the air conditioning apparatus 100 according one or more embodiments, the compressor 22 accommodated in the second unit 20 is a horizontal compressor. The compressor 42 accommodated in the fourth unit 40 is a horizontal compressor.

The second unit 20 and the fourth unit 40 may be installed in a ceiling cavity or the like of each floor in a building or the like. A horizontal compressor is defined as a compressor in which, among the height, depth, and width thereof, the depth or width is the largest. The horizontal compressors 22 and 42 are suitable for being installed in a low-height space, such as a ceiling cavity.

(5) Modification Examples (5-1)

The first refrigerant circuit 1, the second refrigerant circuit 2, and the third refrigerant circuit 3 of the air conditioning apparatus 100 are filled with the first refrigerant, the second refrigerant, and the third refrigerant, respectively, each of which is R32 having high stability. However, the refrigerant cycle system illustrated in the present disclosure may be filled with a refrigerant other than R32. For example, it is preferable that the first refrigerant be R32 and that the second refrigerant and the third refrigerant each be carbon dioxide.

It is preferable that the first refrigerant, the second refrigerant, and the third refrigerant with which the refrigerant cycle system is filled each be any one of HFC refrigerant, HFO refrigerant, and natural refrigerant. Alternatively, it is preferable that the first refrigerant and the second refrigerant each be a mixed refrigerant containing any two or more of HFC refrigerant, HFO refrigerant, natural refrigerant, and $CF_3I$. Specifically, the HFC refrigerant is R32, R125, R134a, R143a, R245fa, or the like. The HFO refrigerant is R1234yf, R1234zd, R1123, R1132(E), or the like. The natural refrigerant is R744, R717, R290, R600a, R1270, or the like.

A refrigerant having flammability or toxicity may be applied as the second refrigerant and the third refrigerant of the air conditioning apparatus 100.

The air conditioning apparatus 100 includes the first cascade heat exchanger 21 and the second cascade heat exchanger 41 and thereby being capable of reducing the amount of refrigerant that flows through each of the refrigerant circuits 1, 2, and 3. Accordingly, it is possible to secure further safety. It is also possible to apply an existing refrigerant cycle system.

(5-2)

Figure 6:
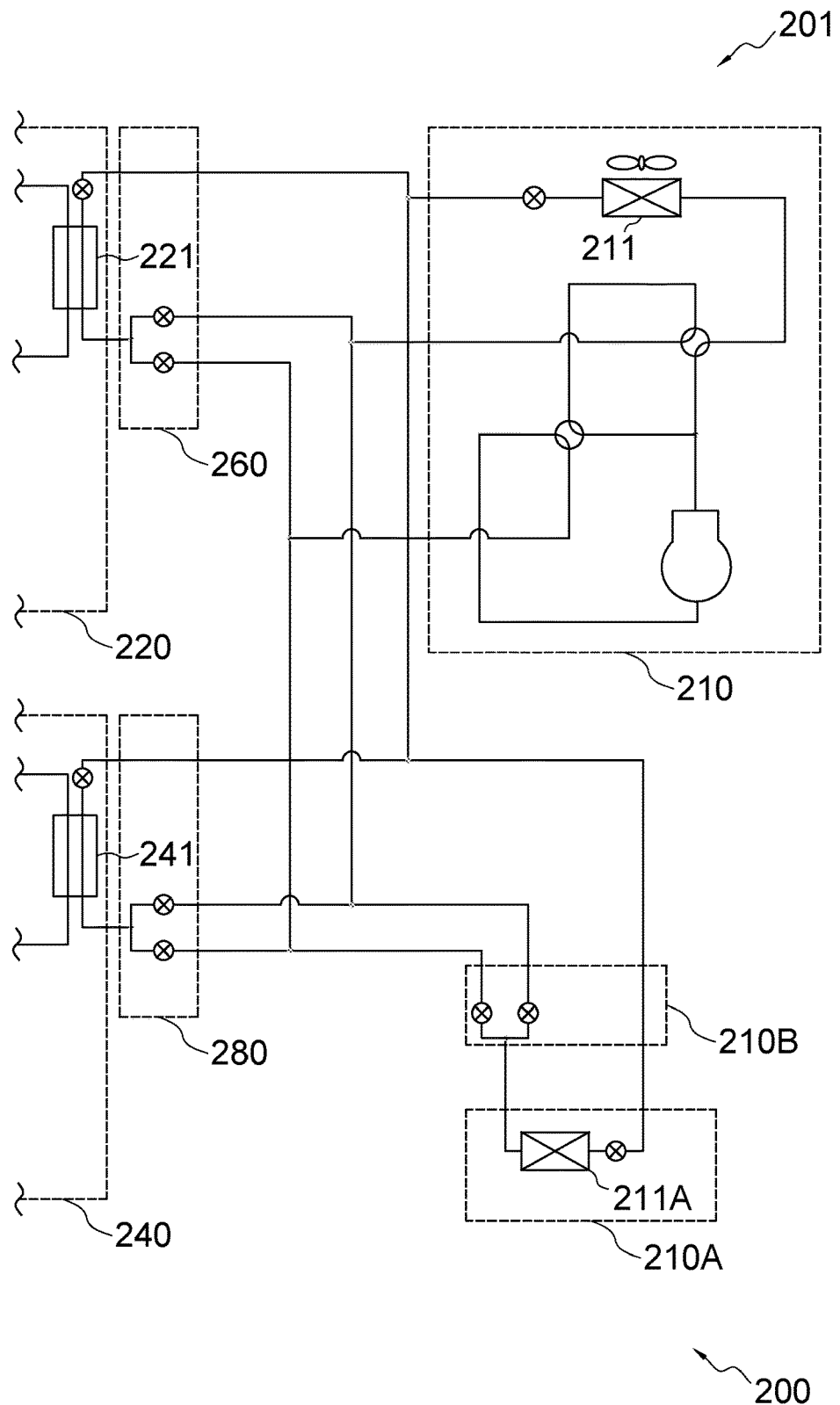
FIG. 6 is a diagram illustrating a first refrigerant circuit according to a modification example of one or more embodiments.

The refrigerant cycle system according to one or more embodiments can also be applied to an air conditioning apparatus 200 illustrated in FIG. 6 as well as the air conditioning apparatus 100 described above.

The air conditioning apparatus 200 may further include a use-side heat exchanger 211A serving as a fourth heat exchanger, and a sixth unit 210A that accommodates the use-side heat exchanger 211A. The use-side heat exchanger 211A is used, in a first refrigerant circuit 201, as a use-side heat exchanger that is a heat exchanger different from a heat-source-side heat exchanger 211 serving as a first heat exchanger, a first cascade heat exchanger 221, and a second cascade heat exchanger 241. The sixth unit 210A accommodates the use-side heat exchanger 211A.

6

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 201 first refrigerant circuit
2 second refrigerant circuit
3 third refrigerant circuit
10, 210 first unit
11, 211 first heat exchanger
12 first compressor
20, 220 second unit
21, 221 first cascade heat exchanger
22 second compressor
30 first unit
31A, 31B second heat exchanger
32A, 32B expansion mechanism
40, 240 fourth unit
41, 241 second cascade heat exchanger
42 third compressor
50 first unit
51A, 51B third heat exchanger
60, 260 first refrigerant flow path switching unit
70A, 70B second refrigerant flow path switching unit
100 refrigerant cycle system
200 refrigerant cycle system
210A sixth unit
211A fourth heat exchanger

The invention claimed is:

1. A refrigerant cycle system comprising:
    a first refrigerant circuit that includes a first heat exchanger, a first compressor, and a first cascade heat exchanger and that is configured as a first vapor compression refrigeration cycle;
    a second refrigerant circuit that includes the first cascade heat exchanger, a second compressor, and a second heat exchanger and that is configured as a second vapor compression refrigeration cycle;
    a third refrigerant circuit that includes a second cascade heat exchanger, a third compressor, and a third heat exchanger;
    a first unit that accommodates the first heat exchanger and the first compressor;
    a second unit that accommodates the first cascade heat exchanger and the second compressor;
    a third unit that accommodates the second heat exchanger;
    a fourth unit that accommodates the second cascade heat exchanger and the third compressor; and
    a fifth unit that accommodates the third heat exchanger, wherein
    the first unit, the second unit, and the third unit are disposed apart from each other,
    the first cascade heat exchanger performs heat exchange between a first refrigerant that flows through the first refrigerant circuit and a second refrigerant that flows through the second refrigerant circuit,
    the first unit, the fourth unit, and the fifth unit are disposed apart from each other, and
    the second cascade heat exchanger performs heat exchange between the first refrigerant and a third refrigerant that flows through the third refrigerant circuit.

2. The refrigerant cycle system according to claim 1, further comprising:
    a first refrigerant flow path switching unit that is disposed between the first unit and the second unit and that switches a flow path of the first refrigerant.

3. The refrigerant cycle system according to claim 1, further comprising
    a second refrigerant flow path switching unit that is disposed between the second unit and the third unit and that switches a flow path of the second refrigerant.

4. The refrigerant cycle system according to claim 1, wherein
    the second refrigerant is flammable or toxic.

5. The refrigerant cycle system according to claim 1, wherein
    each of the first refrigerant and the second refrigerant are one of:
        HFC refrigerant;
        HFO refrigerant;
        natural refrigerant; or
        a mixed refrigerant containing two or more of HFC refrigerant, HFO refrigerant, natural refrigerant, and $CF_3I$.

6. The refrigerant cycle system according to claim 1, wherein
    the first refrigerant is R32.

7. The refrigerant cycle system according to claim 1, wherein
    each of the first refrigerant and the second refrigerant are R32.

8. The refrigerant cycle system according to claim 1, wherein
    the second compressor is a horizontal compressor.

9. The refrigerant cycle system according to claim 1, wherein
the second refrigerant circuit includes an expansion mechanism, and
the second refrigerant that flows into the expansion mechanism is in a gas-liquid two-phase state.

10. The refrigerant cycle system according to claim 1, wherein
the first refrigerant circuit further includes a fourth heat exchanger configured as a use-side heat exchanger, and
a sixth unit accommodates the fourth heat exchanger.

11. A refrigerant cycle system comprising:
a first refrigerant circuit that includes a first heat exchanger, a first compressor, and a first cascade heat exchanger and that is configured as a first vapor compression refrigeration cycle;
a second refrigerant circuit that includes the first cascade heat exchanger, a second compressor, and a second heat exchanger and that is configured as a second vapor compression refrigeration cycle;
a first unit that accommodates the first heat exchanger and the first compressor;
a second unit that accommodates the first cascade heat exchanger and the second compressor;
a third unit that accommodates the second heat exchanger, wherein
the first unit, the second unit, and the third unit are disposed apart from each other,
the first cascade heat exchanger performs heat exchange between a first refrigerant that flows through the first refrigerant circuit and a second refrigerant that flows through the second refrigerant circuit, and
the refrigerant cycle system further includes a second refrigerant flow path switching unit that is disposed between the second unit and the third unit and that switches a flow path of the second refrigerant.

12. A refrigerant cycle system comprising:
a first refrigerant circuit that includes a first heat exchanger, a first compressor, and a first cascade heat exchanger and that is configured as a first vapor compression refrigeration cycle;
a second refrigerant circuit that includes the first cascade heat exchanger, a second compressor, and a second heat exchanger and that is configured as a second vapor compression refrigeration cycle;
a first unit that accommodates the first heat exchanger and the first compressor;
a second unit that accommodates the first cascade heat exchanger and the second compressor; and
a third unit that accommodates the second heat exchanger, wherein
the first unit, the second unit, and the third unit are disposed apart from each other,
the first cascade heat exchanger performs heat exchange between a first refrigerant that flows through the first refrigerant circuit and a second refrigerant that flows through the second refrigerant circuit,
the first refrigerant circuit further includes a fourth heat exchanger configured as a use-side heat exchanger, and
the refrigerant cycle system further includes a sixth unit that accommodates the fourth heat exchanger.

* * * * *